(12) United States Patent
Tietz et al.

(10) Patent No.: US 11,449,603 B2
(45) Date of Patent: Sep. 20, 2022

(54) MANAGING DATA EXFILTRATION RISK

(71) Applicant: ObserveIT LTD, Sunnyvale, CA (US)

(72) Inventors: Oded Tietz, Herzliya (IL); Mayank Choudhary, Shewsbury, MA (US); Nir Barak, Karmel Yosef (IL); Micky Oland, Tel Aviv (IL); Tal Shemesh, Herzliya (IL); Yigal Meshulam, Modiin (IL); Lior Calif, Tel Aviv (IL)

(73) Assignee: Proofpoint, Inc., Sunnyvale, CA (US)

( * ) Notice: Subject to any disclaimer, the term of this patent is extended or adjusted under 35 U.S.C. 154(b) by 217 days.

(21) Appl. No.: 16/643,529

(22) PCT Filed: Aug. 27, 2018

(86) PCT No.: PCT/US2018/048055
§ 371 (c)(1),
(2) Date: Feb. 29, 2020

(87) PCT Pub. No.: WO2019/046147
PCT Pub. Date: Mar. 7, 2019

(65) Prior Publication Data
US 2020/0193019 A1 Jun. 18, 2020

Related U.S. Application Data

(60) Provisional application No. 62/552,438, filed on Aug. 31, 2017.

(51) Int. Cl.
*G06F 21/55* (2013.01)
*G06F 16/11* (2019.01)
*G06N 5/02* (2006.01)

(52) U.S. Cl.
CPC .......... *G06F 21/552* (2013.01); *G06F 16/11* (2019.01); *G06N 5/027* (2013.01); *G06F 2221/034* (2013.01)

(58) Field of Classification Search
CPC ........ G06F 21/552; G06F 16/11; G06N 5/027
See application file for complete search history.

(56) References Cited

U.S. PATENT DOCUMENTS 9,043,905 B1    5/2015  Allen et al.
9,292,404 B1*   3/2016  Schepis ............... G06F 11/0775
(Continued)

OTHER PUBLICATIONS

WikipediA (Login session, May 5, 2015, 2 pages) (Year: 2015).*
(Continued)

*Primary Examiner* — Oleg Korsak
(74) *Attorney, Agent, or Firm* — Sheehan Phinney Bass & Green PA

(57) ABSTRACT

A computer-based method is disclosed to facilitate managing data exfiltration risk in a computer network environment. The method includes collecting computer file management information associated with each respective one of a plurality of computer files in an organization's computer network environment from a computer operating system, collecting user activity information associated with each respective one of a plurality of user sessions by users having access to the organization's computer network environment with a plurality of session monitoring agents, correlating at least some of the collected user activity information to one or more of the computer files associated with the collected file management information; and assessing data exfiltration risk with respect to one or more of the computer files based at least in part on some of the file management information and the correlated user activity information associated with a file history chain.

24 Claims, 13 Drawing Sheets

(56) References Cited

U.S. PATENT DOCUMENTS

| | | | |
|---|---|---|---|
| 9,641,544 B1 | 5/2017 | Treat et al. | |
| 10,033,702 B2* | 7/2018 | Ford | G06F 16/951 |
| 10,642,998 B2* | 5/2020 | Ford | H04L 67/306 |
| 10,853,496 B2* | 12/2020 | Ford | G06F 21/552 |
| 10,915,643 B2* | 2/2021 | Ford | H04L 63/1408 |
| 11,223,646 B2* | 1/2022 | Cunningham | H04L 67/22 |
| 2003/0182583 A1 | 9/2003 | Turco | |
| 2012/0233222 A1 | 9/2012 | Roesch | |
| 2013/0097709 A1 | 4/2013 | Basavapatna | |
| 2014/0157407 A1 | 6/2014 | Krishnan et al. | |
| 2015/0205954 A1* | 7/2015 | Jou | G06F 21/316 726/22 |
| 2015/0205962 A1 | 7/2015 | Swidowski et al. | |
| 2016/0065601 A1 | 3/2016 | Gong et al. | |
| 2018/0027006 A1* | 1/2018 | Zimmermann | H04L 63/0245 726/11 |

OTHER PUBLICATIONS

Extended European Search Report for EP18850695 dated Apr. 9, 2021.
International Search Report and Written Opinion dated Nov. 2, 2018 for PCT/US18/48055.

* cited by examiner

FIG.3 observe it    INSIDER THREAT INTELLIGENCE    MANAGEMENT CONSOLE    Welcome, Admin | Sign Out Admin Dashboard

| ENDPOINT DIARY | USER DIARY | FILE DIARY | DBA ACTIVITY | ALERTS | CONFIGURATION | SEARCH | REPORTS |

File Monitoring

File Activity | File History

Original File Name: customers.numbers    File Source:    https://mail.google.com/mail/u/0/#inbox/15d7531357ba12f3
Original File Path: /Users/nirbarak/Downloads/    File ID:    f98f57c9-659c-467c-af26-b67b83f26211

| Time | | File name | Operation | Details | Login | Application | Endpoint | Video |
|---|---|---|---|---|---|---|---|---|
| 18:23 PM | ↙ | customers.numbers | | /Users/nirbarak/Do... | nirbarak | Google Ch... | nirs-mbp | ▭ |
| 18:23 PM | ↙ | customers.numbers | | /Users/nirbarak/ | nirbarak | Finder | nirs-mbp | ▭ |
| 18:24 PM | ↙ | customers.numbers | | picture_01.png | nirbarak | Finder | nirs-mbp | ▭ |
| 18:24 PM | ↙ | picture_01.png | | /Users/nirbarak/Dr... | nirbarak | Finder | nirs-mbp | ▭ |

Latest Sessions nirs-mbp    nirbarak
u-nirbarak    nirb
ol55-64-7    gabi
mini-mac2    doron
W12-S12-D...    Administrator
c64-64-5    root
c59-64-12    nirb

MANAGING DATA EXFILTRATION RISK

CROSS-REFERENCE TO RELATED APPLICATIONS

This application is a national stage application, filed under 35 U.S.C. § 371, of International Application No. PCT/US 18/48055, filed Aug. 27, 2018, which claimed the benefit of U.S. Provisional Patent Application No. 62/552,438, filed Aug. 31, 2017. The contents of the prior applications are incorporated by reference herein in their entireties.

FIELD OF THE INVENTION

This disclosure relates to managing data exfiltration risk and, more particularly, managing data exfiltration risk in a computer network (e.g., for an organization).

BACKGROUND

Data exfiltration is the unauthorized transfer of data from a computer. Such a transfer may be manual and carried out by someone with physical access to a computer in a network. Data exfiltration, particularly when done by an insider (e.g., an organization's own employee), can be a huge threat to an organization.

SUMMARY OF THE INVENTION

In one aspect, a computer-based method is disclosed to facilitate managing data exfiltration risk in a computer network environment. The method includes collecting computer file management information associated with each respective one of a plurality of computer files in an organization's computer network environment from a computer operating system, collecting user activity information associated with each respective one of a plurality of user sessions by users having access to the organization's computer network environment with a plurality of session monitoring agents, correlating at least some of the collected user activity information to one or more of the computer files associated with the collected file management information; and assessing data exfiltration risk with respect to one or more of the computer files based at least in part on some of the file management information and the correlated user activity information.

In a typical implementation, the computer-based method includes presenting an alert to one or more particular system users (e.g., system administrators), if the assessment reveals that the data exfiltration risk exists with respect to any one or more of the computer files, and/or preventing a user action that would result in a data exfiltration associated with one of the computer files, if the assessment reveals that the data exfiltration risk exists with respect to that computer file.

The exfiltration risk typically is assessed without regard to content in any of the one or more computer files.

In another aspect, a computer system is disclosed that facilitates managing data exfiltration risk in a computer network environment. The computer system includes a plurality of computer-based user access devices and resources within a computer network that has a firewall, an operating system to support computer operations within the computer network, and an exfiltration detection and response system configured to interact with the operating system, and to facilitate managing data exfiltration risk in the computer network.

The data exfiltration system includes a file interceptor to receive computer file management information associated with each respective one of a plurality of computer files in the computer network from the operating system, one or more session-monitoring agents to collect user activity information associated with each respective one or more user sessions on the computer network by users having access to the computer network, a history and exfiltration tracker to correlate at least some of the collected user activity information to one or more of the computer files associated with the file management information received from the operating system, and a rules engine to assess exfiltration risk with respect to one or more of the computer files based at least in part on some of the file management information and the correlated user activity information.

In some implementations, one or more of the following advantages are present. Data exfiltration can be identified either as it is happening or very shortly thereafter. The user implementing the data exfiltration, or attempting to implement the data exfiltration, can be stopped and/or prevented from performing other actions on the network—at least until a person in some authority (e.g., a system administrator or the like) can assess the situation to determine the real risk and whether the user was acting maliciously. Along those lines, the person in authority can be alerted to the data exfiltration immediately—either as it is happening or shortly thereafter. This enables that person to take immediate and timely action to remedy any potential damage. The user attempting to exfiltrate the data can be notified as well that his or her actions are not permissible. A clear and complete record of the data exfiltration, including the identity of the involved user and exactly what the user did is created and stored for later analysis.

All of this typically happens automatically (e.g., once the system is up and running, it monitors and blocks/reports without requiring further involvement, aside from perhaps routine maintenance) from a system administrator.

Moreover, the techniques and technologies disclosed herein are light, from a processing perspective. That is, they require relatively little in terms of processing resources. They are quick, reliable and robust as well.

In short, the techniques and technologies disclosed herein have the potential to significantly prevent, deter, and/or minimize the detrimental effects associated with data exfiltration in an organization's computer network.

Other features and advantages will be apparent from the description and drawings, and from the claims.

BRIEF DESCRIPTION OF THE DRAWINGS

FIGS. 3-9 are exemplary screenshots showing functionalities associated with the exfiltration detection and response system that might be viewable by a system administrator, or the like, from one or more of the user access devices in FIG. 1.

Like reference characters refer to like elements.

DETAILED DESCRIPTION

Figure 1:
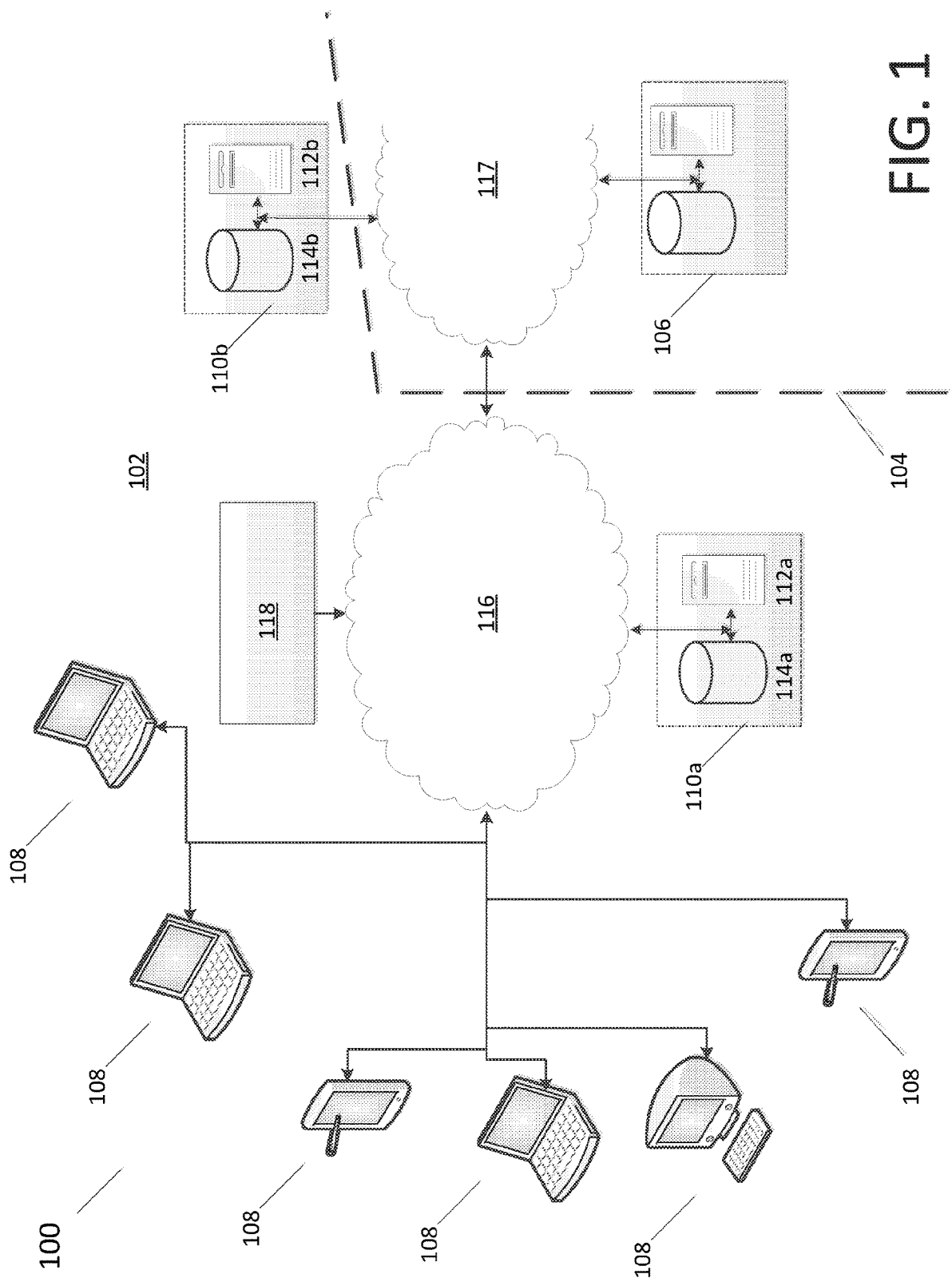
FIG. 1 is an exemplary computer network environment that includes part of a computer network with a firewall that restricts communications between the computer network and other computer resources and devices outside of the computer network and an exfiltration detection and response system.

FIG. 1 is an exemplary computer network environment 100 that includes part of a computer network 102 with a firewall 104 that restricts communications between the computer network 102 and other computer resources and devices 106 (e.g., via the Internet 117) outside of the computer network 102.

The part of the computer network 102 represented in the illustrated implementation includes a plurality of computer devices 108 (e.g., computer-based user-access devices), from which an appropriately authorized user can access one or more of the organization's computer-based resources (e.g., programs, files, etc.) within the firewall 104. These resources can be stored or hosted locally (e.g., at a local host 110a that includes processing 112a and memory storage 114a capabilities) or remotely (e.g., at remotely-located host 110b that includes processing 112b and memory storage 114b capabilities). According to the illustrated implementation, the resources at the local host 110a can be accessed by an authorized user from any one of the plurality of computer devices 108, via a local area network 116. Moreover, according to the illustrated implementation, the resources at the remote host 110b can be accessed by an authorized user from any one of the plurality of computer devices 108, via the local area network 116 and the Internet 117.

The computer network 102 in the illustrated implementation has an exfiltration detection and response system 118 that is configured to facilitate managing data exfiltration risk in the computer network 102. More particularly, in this regard, the exfiltration detection and response system 118 is configured to detect and respond to any scenarios that might occur during network operations that indicate or suggest that a data exfiltration event has occurred or is about to occur. Data exfiltration refers generally to the unauthorized removal or copying of a computer file, or its contents, for example, to outside of the organization's computer network 102 (e.g., beyond the confines of the firewall 104). Data exfiltration risk refers generally to the possibility that some kind of data exfiltration either has occurred or is about to occur and has potential to harm the organization.

The exfiltration detection and response system 118 may take into account any one or more of a variety of different factors to determine whether a data exfiltration risk exists. In various implementations, these factors can include or relate to file management information (e.g., as collected by a file management system in the network operating system), and/or user activity information (e.g., as collected by a computer-based session-monitoring agent during one or more user sessions within the computer network 102). These factors generally do not include any substantive content of the computer files that are subjected to exfiltration.

The file management system is a computer-based system that the network's operating system, for example, may use to organize and keep track of files. In a typical implementation, the file management system is responsible for creating, deleting, modifying, and controlling access to computer files in an organization's computer network (e.g., 102). Some of the file management information that the exfiltration detection and response system 118 might take into account in determining whether a data exfiltration risk exists with respect to a particular computer file in the computer network 102 includes: the origin of the file (e.g., where in computer network 102 the file was first created and/or stored), metadata of the file at its origin (e.g., file name, file size, etc.), whether the file has been copied or is a copy of another file, whether the file has been given a different name than its original one, whether the file has been stored in a location that is different from its original location, whether the file has been reformatted (e.g., from a .doc file to a .jpg file, etc.), whether the file has been or is being moved to a particular location (especially outside the network 102), whether the file has been opened by a particular user, whether a particular file has been deleted, whether a user has run a search for a particular file, and/or whether a user has modified one or more file attributes, properties, or file permissions associated with a particular file.

The session-monitoring agents are computer-based activity monitors that monitor the activities of a user during sessions on the computer network 102. In some implementations, one session-monitoring agent is deployed (e.g., by the exfiltration detection and response system 118) for each respective user session that gets initiated on the computer network 102. In those typical implementations, a new session-monitoring agent is deployed each time a new user session is initiated (e.g., each time a user logs into the computer network 102 to gain access to the network's resources, programs and/or files). More typically, a session-monitoring agent is deployed just once—when a user logs in, and simply stops running when the user logs out. Some of the user activity information that the exfiltration detection and response system 118 might take into account in determining whether a data exfiltration risk exists with respect to a particular computer file includes: what application(s) (e.g., web browsers, etc.) a user is using at a particular time, what the user is doing with that (those) application(s), what websites (e.g., identified by uniform resource locator (URL)) a user is visiting, metadata (e.g., specific commands, such as FTP requests, being run, etc.) about the application (s) a user is using, etc.).

Notably, none of this information—e.g., file management information, or user activity information—relates to (or includes) any substantive content of the computer files themselves. For example, none of this information relates to (or includes) any of the words, characters, or other substantive content stored in the computer files themselves. To be more specific, in a typical implementation, the exfiltration detection and response system 118 assesses data exfiltration risk (and facilitates management of data exfiltration risk) with respect to specific computer files without taking into account any substantive content from the computer files themselves. This is one of the reasons why the computing techniques disclosed herein that facilitate managing data exfiltration risk are so light—the amount of data that is taken into account is low. And, although the amount of data taken into account is low, the performance (and ability to facilitate managing data exfiltration risk) is robust and reliable.

Figure 2:
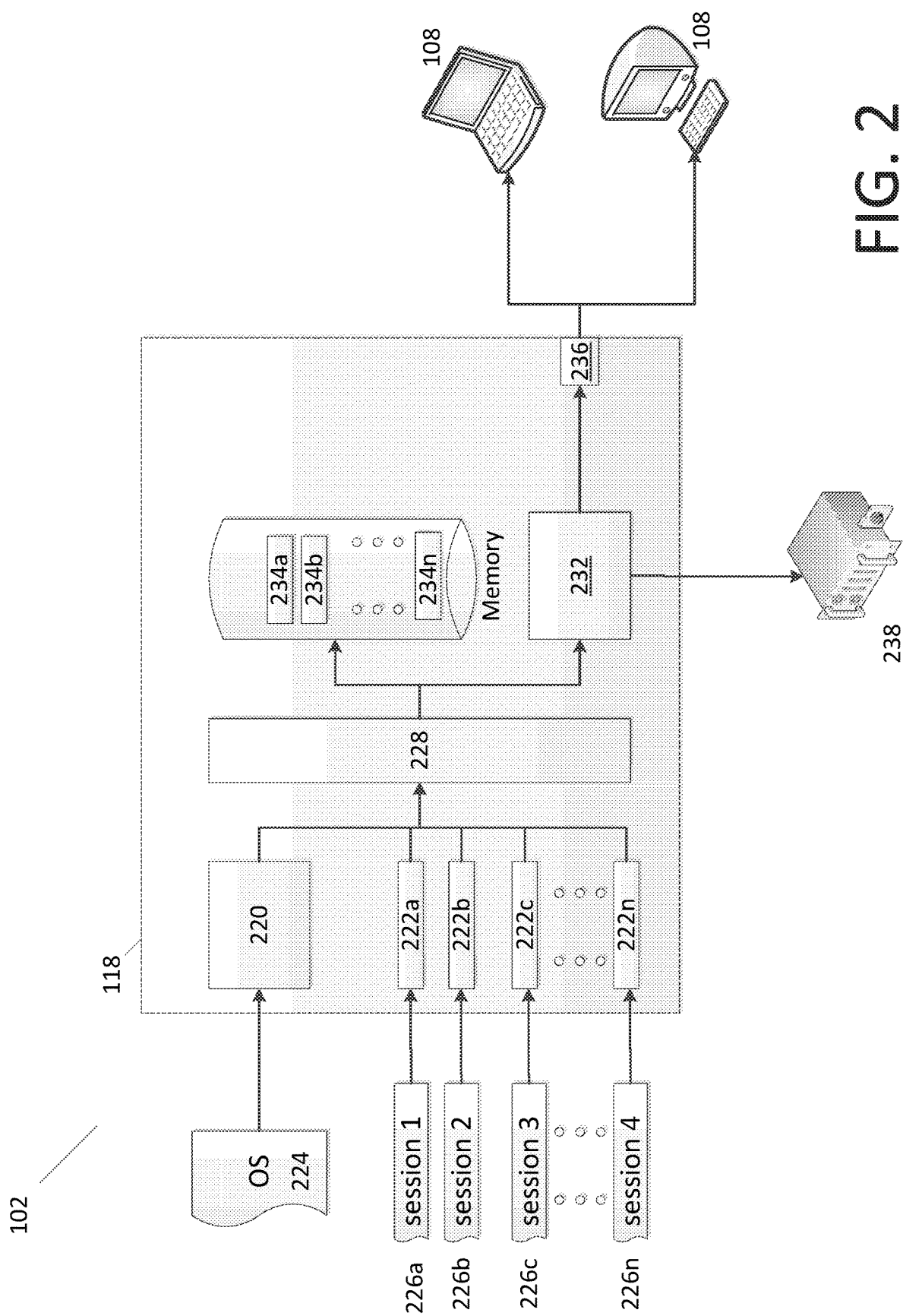
FIG. 2 is a schematic representation showing part of the computer network in FIG. 1, with a particularly detailed, yet exemplary, representation of the exfiltration detection and response system.

FIG. 2 is a schematic representation showing part of the computer network 102 in FIG. 1, with a particularly detailed representation of an exemplary exfiltration detection and response system 118.

The illustrated exfiltration detection and response system 118 has a file interceptor 220 and a plurality of session-monitoring agents 222a, 222b, 222c . . . 222n.

During network operations, the file interceptor 220 collects computer file management information associated with each respective one of a plurality of computer files in the computer network 102 from the computer network's operating system 224. The file interceptor 220 may receive the file management information from the computer network's operating system 224, for example, periodically in bundles, as new file management information becomes available, or in any other convenient manner. In a typical implementation, the exfiltration detection and response system 118 registers with the operating system 224 so that the file interceptor 220 will receive the file management information from the operating system 220. In a typical implementation, the operating system 220 simply provides this information to the file interceptor 220 condition-free and simply performs its functionalities without waiting for the exfiltration detection and response system 118 to check for exfiltration risk based on a particular piece of file management information provided. In some implementations, however, the file management information may be provided to the file interceptor 220 with a call-back condition, requiring an indication, for example, from the exfiltration detection and response system 118 that any actions associated with a particular piece of file management information provided (e.g., the moving of a file) does not pose a data exfiltration risk before allowing that action (e.g., the moving of the file) to happen.

Each session-monitoring agent 222a, 222b, 222c, . . . 222n in the illustrated implementation is associated with, and adapted to receive user activity information from one of a plurality of a user sessions 226a, 226b, 226c, . . . 226n on the network 102, respectively. In a typical implementation, the number of session-monitoring agents 222a, 222b, 222c . . . 222n deployed on the network 102 can vary over time, and, at any given point of time, the number of session-monitoring agents 222a, 222b, 222c . . . 222n deployed on the network 102 will match the number of user sessions that are active on the network 102. For example, at one point in time, if there is only one active user session on the network 102 (e.g., only one user logged into the network 102), there will be only one session-monitoring agent deployed on the network 102 and that session-monitoring agent will receive user activity information from the one active user session. At other times, there may be many users logged into the network and, therefore, many active user sessions (one per user). At those points in time, there will be many session-monitoring agents deployed on the network 102—one per active user session, and each session-monitoring agent will receive user activity information from one of the many active user sessions, respectively.

The illustrated exfiltration detection and response system 118 also has a history and exfiltration tracker 228 that is configured to communicate with the file interceptor 220 and each active session-monitoring agent 222a, 222b, 222c, . . . 222n. The history and exfiltration tracker 228 receives data (e.g., the file management information and user activity information collected by the file interceptor 220 and the session-monitoring agents 222a, 222b, 222c . . . 222n, respectively). In a typical implementation, the history and exfiltration tracker 228 determines, based at least in part on the data it receives, which, if any, of the computer files in the network 102 should be tracked for purposes of managing data exfiltration risk. In some implementations, this determination is made on a file-by-file basis, and may be based on one or more parameters or characteristics of each file.

As an example, the history and exfiltration tracker 228 might determine that a particular file warrants tracking for purposes of managing data exfiltration risk based on that file's original storage location in the computer network 102. So, if the particular file was created into a network storage location that a system administrator, for example, had designated for storing sensitive or confidential information, then the history and exfiltration tracker may determine that that particular file warrants tracking for purposes of managing data exfiltration risk. As another example, the history and exfiltration tracker 228 might determine that a particular file warrants tracking based on specific actions that a user may have taken in connection with that file. So, if a user has converted a particular file from a .doc format (e.g., a text file) to a .jpg format (e.g., an image file), then the history and exfiltration tracker may determine that that particular file warrants tracking for purposes of managing exfiltration risk. The underlying rationale for designating this kind of file for tracking might be that the user's behavior—in converting the file format from text to image—seems a bit suspicious, particularly if the file in question might include sensitive or confidential information. As yet another example, the history and exfiltration tracker 228 might determine that a particular file warrants tracking based on a combination of that file's original storage location (e.g., a location designated for storing somewhat, or possibly, sensitive materials) and/or potentially suspicious activities by a user relating to that file. There might be other bases (e.g., a file having been downloaded from the web or from a specific website, etc.) upon which the history and exfiltration tracker 228 might determine a particular file warrants tracking for purposes of managing exfiltration risk.

In various implementations, some or all of the bases upon which the history and exfiltration tracker 228 might determine a particular file warrants tracking for purposes of managing exfiltration risk can be preprogrammed or customized/specified by a user (e.g., a system administrator). For example, the network 102 may be configured such that a user (e.g., a system administrator) can specify, from one of user access devices 108, which parameters (e.g., sensitive storage locations, suspicious user actions, etc.) should trigger the history and exfiltration tracker 228 to designate a particular file for tracking.

For each respective one of the computer files that the history and exfiltration tracker 228 designates for tracking, the history and exfiltration tracker creates and maintains a file history chain 234a, 234b . . . 234n. Each respective one of the file history chains 234a, 234b . . . 234n typically includes at least some (or all) of the file management information and correlated user activity information associated with a particular one of the tracked computer files.

In this regard, in a typical implementation, the history and exfiltration tracker 228 correlates the user activity information to the file management information for each of the tracked computer files. According to one exemplary implementation, the history and exfiltration tracker 228 performs this correlation by comparing various types of data (e.g., time stamp information, session identifiers, user identifiers, process identifiers, metadata, etc.) associated with the file management information to the same or similar types of data (e.g., time stamp information, session identifiers, user identifiers, process identifiers, metadata etc.) associated with the user activity information.

Correlating information from these two different data sources (e.g., file management information and user activity information) gives the history and exfiltration tracker 228 deep context about each particular file being tracked within the network 102 to facilitate exfiltration risk assessment on those files.

If, for example, a user downloads his or her employer's confidential customer list through a web browser, using file transfer protocol (FTP), for example, and then attaches that customer list to an email from the user's personal email account (using the Gmail® electronic mail service, for example), the history and exfiltration tracker 228 may receive user activity information indicating that the user accessed his or her personal email account and file management information indicating that a file from a confidential storage location (the confidential customer list) was being attached to an email. On their own, each piece of information in this regard may be interesting, but together they are quite interesting.

In a typical implementation, the history and exfiltration tracker 228 will correlate these two pieces of information (e.g., by saving them into a single file history chain) based on their respective time stamps indicating that the activities happened at the same time or close in time, user identifiers indicating that the same user was involved in both activities, common or similar process identifiers indicating that the same or similar processes were involved in both activities, and/or other metadata or information showing commonalities between the activities that might make one relevant to the other. Notably, in a typical implementation, correlating file management information and user activity information does not involve, or rely upon, consideration of any substantive content in the computer file at issue.

Once created, the file history chains 234a, 234b . . . 234n may be stored in any convenient storage location on the network 102, such as computer-based memory storage 230. In a typical implementation, the history and exfiltration tracker 228 stores, for each respective one of computer files identified for tracking, the computer file management information and any user activity information that has been correlated to the computer file management information in the file history chain for that computer file. Moreover, as new pieces of information relevant to a particular tracked file arrives at the history and exfiltration tracker 228 that new information can be correlated as appropriate and added to the file history chain for that computer file. Thus, at any point in time, the file history chain 234a, 234b . . . 234n for all of the tracked computer files will be generally up-to-date.

The illustrated history and exfiltration tracker 228 also has a rules engine 232. The rules engine 232 in a typical implementation is configured to apply rules (or logic) to a set of data (e.g., the file history chain for any of the tracked computer files) to determine whether a particular user activity on a particular one of the tracked computer files creates an exfiltration risk (i.e., a risk that data exfiltration has happened or may be about to happen) that warrants some kind of action (e.g., generating an alert, blocking a user action, etc.) by the history and exfiltration tracker 228.

The rules engine 232 typically performs its role by considering not only its own rules, but also the file history chain for the file at issue (including, e.g., the file's original storage location, whether there have been any suspicious user activities on that file, etc.). Notably, in a typical implementation, the rules engine performs its role without any regard to substantive content contained in the file at issue. In a typical implementation, the rules engine 232 performs its role every time a new piece of information relevant to one of the tracked files is added to the file history chain 234a, 234b . . . 234n for that file. However, in some implementations, the rules engine 232 performs this function at set time intervals (for all or some of the files), based on some other trigger, etc.

There are a number of different rules that could be used by the rules engine to determine that a particular user activity on a particular file creates an exfiltration risk that warrants some action by the exfiltration detection and response system 118. Some examples of these rules might include: 1) take an action if a file from a sensitive or confidential storage location is about to be sent (or has been sent) to an email address not associated with the organization (e.g., a personal email address), 2) take an action is a file from a sensitive or confidential storage location has had its format changed (e.g., from a text format to an image format) and is now about to be saved (or has been saved) in a non-sensitive and non-confidential storage location, 3) take an action if any file has been subjected to a certain type of suspicious user activity and is now poised to be removed (or has been removed) from the network, etc. The rules or logic in the rules engine 232 can be preprogrammed rules, user-specified rules, or a combination of both. In implementations where the rules or logic can be user-specified, a system administrator, for example, may be able program those rules or logic into the rules engine 232 from any one of the user access devices 108 in the network 102. The rules can be broad (e.g., generate an alert if any file from a particular storage location is attached to an email, shut down the user session if certain users access a file from a particular storage location, etc.) or specific (e.g., generate an alert if a particular file is attached to a personal email account of a specific user). Different rules can apply to different users, roles within the organization, files, types of files, storage locations, times of day, days of the week, etc.

There are various actions that the exfiltration detection and response system 118 can take in response to the rules engine 232 determining that a particular user activity on a particular one of the tracked computer files creates an exfiltration risk that warrants some kind of action.

For example, the exfiltration detection and response system 118 may cause an alert to be sent to a system administrator and/or other designated alert recipient(s).

The alert may be sent in any number of possible ways including, for example, via text, email, phone call, etc. In some implementations, the way that an alert is sent can be specified/personalized by the system administrator, or other intended recipient. The alert may indicate generically that a data exfiltration risk has been identified, or may include, or facilitate access to, additional information about the data exfiltration risk—e.g., what the risk is (e.g., a file from a sensitive location has been attached to an email, a file from a sensitive location has had its format changed from text to an image, etc.), which network user is involved, the time and date of the event, where the event happened (e.g., in the office, outside the office from a computer logged into the network, etc.), etc. In some implementations, the alert may present the system administrator with information that helps the system administrator take whatever next steps might be appropriate. For example, the alert may include, or facilitate access to, contact information for the user involved, a button that the system administrator can select to block the involved user from taking any further actions or from taking a specific action, an option that allows the system administrator to text or email with etc. In some implementations, the alert may include an option to share the alert with others within the organization.

As another example, the exfiltration detection and response system 118 may send a message to the user involved in the activity that created the exfiltration risk. The message, of course, may be sent in any number of possible ways including, for example, via pop-up on a user's screen, text, email, phone call, etc. In some implementations, the way that an alert is sent can be specified/personalized by the system administrator. The message may indicate generically that some activity that the user is engaged in has been flagged as creating a risk of data exfiltration, or may include, or facilitate access to, additional information about the data exfiltration risk—e.g., what the risk is (e.g., a file from a sensitive location has been attached to an email, a file from a sensitive location has had its format changed from text to an image, etc.), etc.

As another example, the exfiltration detection and response system 118 may automatically block one or more user activities after a determination that an activity by the user has created an exfiltration risk that warrants blocking. There are a variety of ways that user activities may be blocked. In one exemplary implementation, the exfiltration detection and response system 118 may cause the operating system to terminate the user's session. In another exemplary implementation, the exfiltration detection and response system 118 may cause the network 102 to block only specific actions (e.g., sending an email) on the network 102. In some implementations, the exfiltration detection and response system 118 may block the user's screen.

In some implementations, the exfiltration detection and response system 118 may take more than one actions in response to the rules engine 232 determining that a particular user activity on a particular one of the tracked computer files creates an exfiltration risk that warrants some kind of action. For example, in some implementations, the exfiltration detection and response system 118 may send a message to the user involved in the questionable activity and to the system administrator. In some implementations, the exfiltration detection and response system 118 may block a user's actions on the network 102 and send an alert to the system administrator. In some implementations, the exfiltration detection and response system 118 may block a user's actions on the network 102, send an alert to the system administrator, and send a message to the user involved in the questionable activity. Other actions and/or combinations of actions in this regard are possible as well.

In a typical implementation, the rules engine 232 may store information about its determinations regarding exfiltration risk and any actions taken as a result of those determinations. In this regard, the rules engine 232 in the illustrated implementation is coupled to (and stored this, and perhaps other information in) a server 238 that is outside the exfiltration detection and response system 118. In some implementations, the information stored in this regard includes the underlying file history chain(s) as well. The information stored in the server 238 may be used after the fact by a system administrator, for example, to analyze a particular circumstance that may have been flagged as a data exfiltration risk.

The illustrated exfiltration detection and response system 118 has an output 236 that is coupled to the user access terminals 108, and through which the exfiltration detection and response system 118 can send alerts, messages, instructions, etc. to implement associated reactions to data exfiltration risks.

FIGS. 3-9 are screenshots that might appear, for example, at one or more of the user access devices 108 in a network 102 when user is logged into the network 102 through that device 108. These screenshots correspond to only one exemplary implementation of the exfiltration detection and response system 118 being implemented on a network.

The screenshot in FIG. 3 shows file history, and other data for a tracked file—a list of customer names—in the network 102. More particularly, the illustrated screenshot identifies the original file name, the file source, the original file path, and a file identification code. Moreover, the screenshot includes a chronological listing of user actions taken with respect to the tracked file. In a typical implementation, the chronological listing of user actions includes information from or related to the file history chain for the file.

The chronological listing of user actions taken with respect to the tracked file specifies, for each entry, the time (and, typically, date), the file name, the operation, details, the user logged in (who performed the action), the application involved, the end point, and a link to a video of the associated user session when the action happened. The video may be captured, for example, by the session-monitoring agent operating when each action happened. According to the chronological listing in the illustrated screenshot, user, nirbarak, downloaded the customers.numbers file, converted that file into an image (.png) file, and then moved the image file into a dropbox. The last entry in the chronological listing has a bell symbol to the left of the listing that indicates that an alert became associated with that file upon that entry. Presumably, the rules engine determines that, under the indicated circumstances (e.g., sensitive information, being converted from a text file into an image file, and then being moved to a dropbox) warranted an alert.

In a typical implementation, one can reach the screen of FIG. 3 from either an alert itself or from one of the file activities in a file history chain, that can appear, for example, in another system diary. In some implementations, information about the operation performed is provided under the column heading "operation."

In a typical implementation, a user viewing the screenshot in FIG. 3 can click on any one of the entries to access more information about the associated user action.

Figure 4:
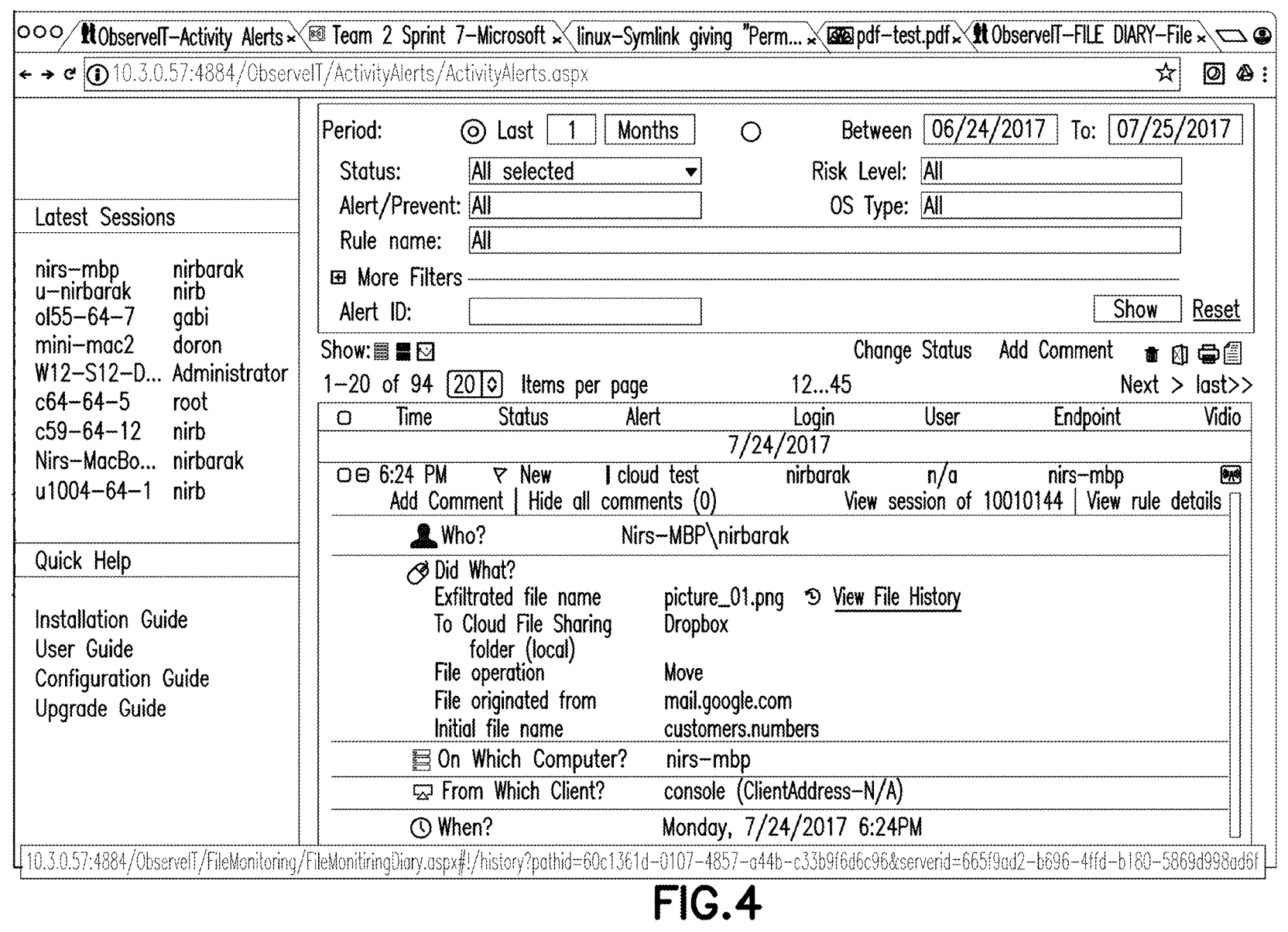

The system also typically allows a user (e.g., a system administrator or the like) to search for various types of user actions that may have occurred with respect to tracked files. FIG. 4 shows one example of a search screen that allows the user to search based on time period, status (e.g., new, old, etc.), risk level (e.g., high, medium, low, etc.), whether an alert was generated or an action was prevented, the type of operating system, the applicable rule name that may have been implicated, an identification code for the associated alert, and/or other filters.

The bottom portion of the FIG. 4 screenshot shows the first result of a search conducted based on the parameters specified in the top portion of the FIG. 4 screenshot. This result just so happens to correspond to the last entry in the chronological listing of user action involving the customers.numbers file in FIG. 3. The information about this user action provided in the bottom portion of the screenshot in FIG. 4 specifies who performed the action, what the action was (e.g., the exfiltrated file, the destination of the exfiltrated file, the file operation performed to exfiltrate, where the file originated from, and the initial file name), on which computer the action happened, from which client, and when.

The bottom portion of the FIG. 4 screenshot also has a link to "View File History," which, if selected, would return the user to the screenshot of FIG. 3.

Referring again to FIG. 3, as mentioned above, each entry in the chronological listing of user actions relating to the customers.numbers file includes a camera symbol that is a link to a video showing the user action that corresponds to the associated entry. In a typical implementation, clicking on that camera symbol causes the system to present to the user the associated video. To be clear, the video shows what was happening on the screen of the user that performed the action at issue when that action was performed (and may include actions leading up to and/or following the action at issues).

FIGS. 5A-5E are screenshots showing stills from a video that might be presented to a user if that user clicked on the camera icon for the last entry in the chronological listing in FIG. 3. The video is being played in a video player.

Figure 5A:
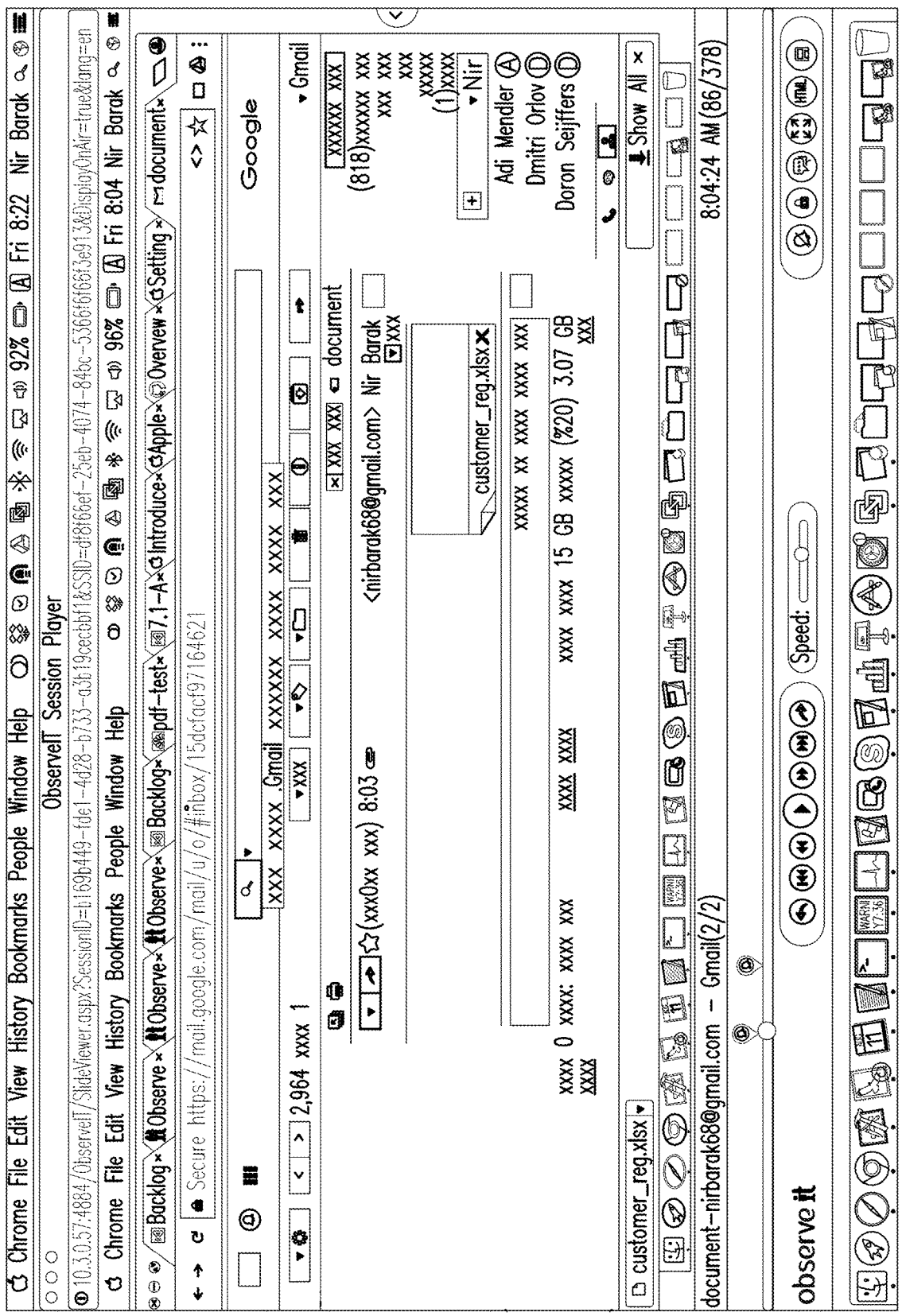

In FIG. 5A the video player shows the user action of downloading the file.

Figure 5B:
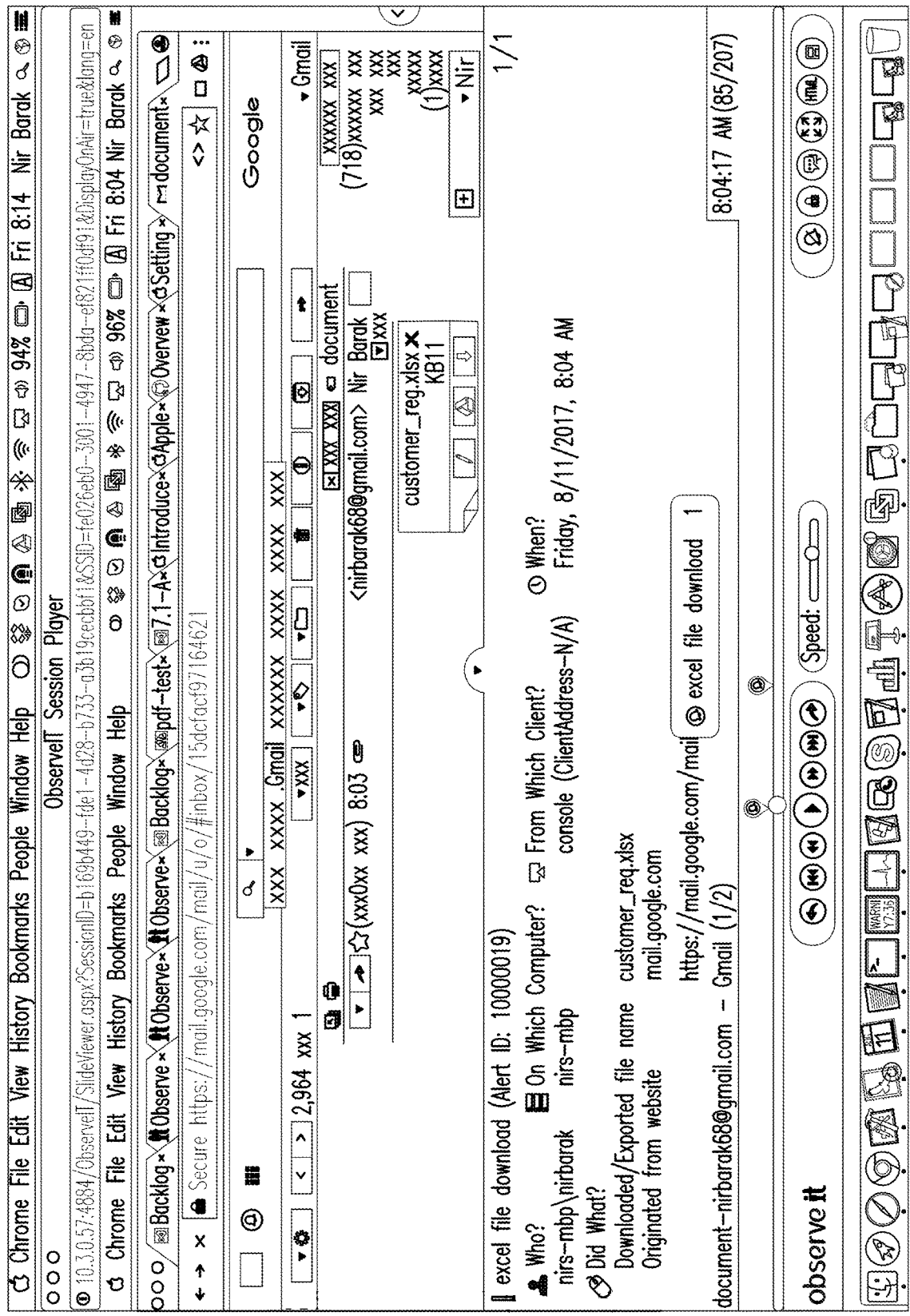

In FIG. 5B the video player shows an alert on entry point. The alert in the illustrated example indicates who performed the action that caused the alert, on which computer, from which client, and when. The alert also identifies what was done, including specifying the file name and the originated from website.

Figure 5C:
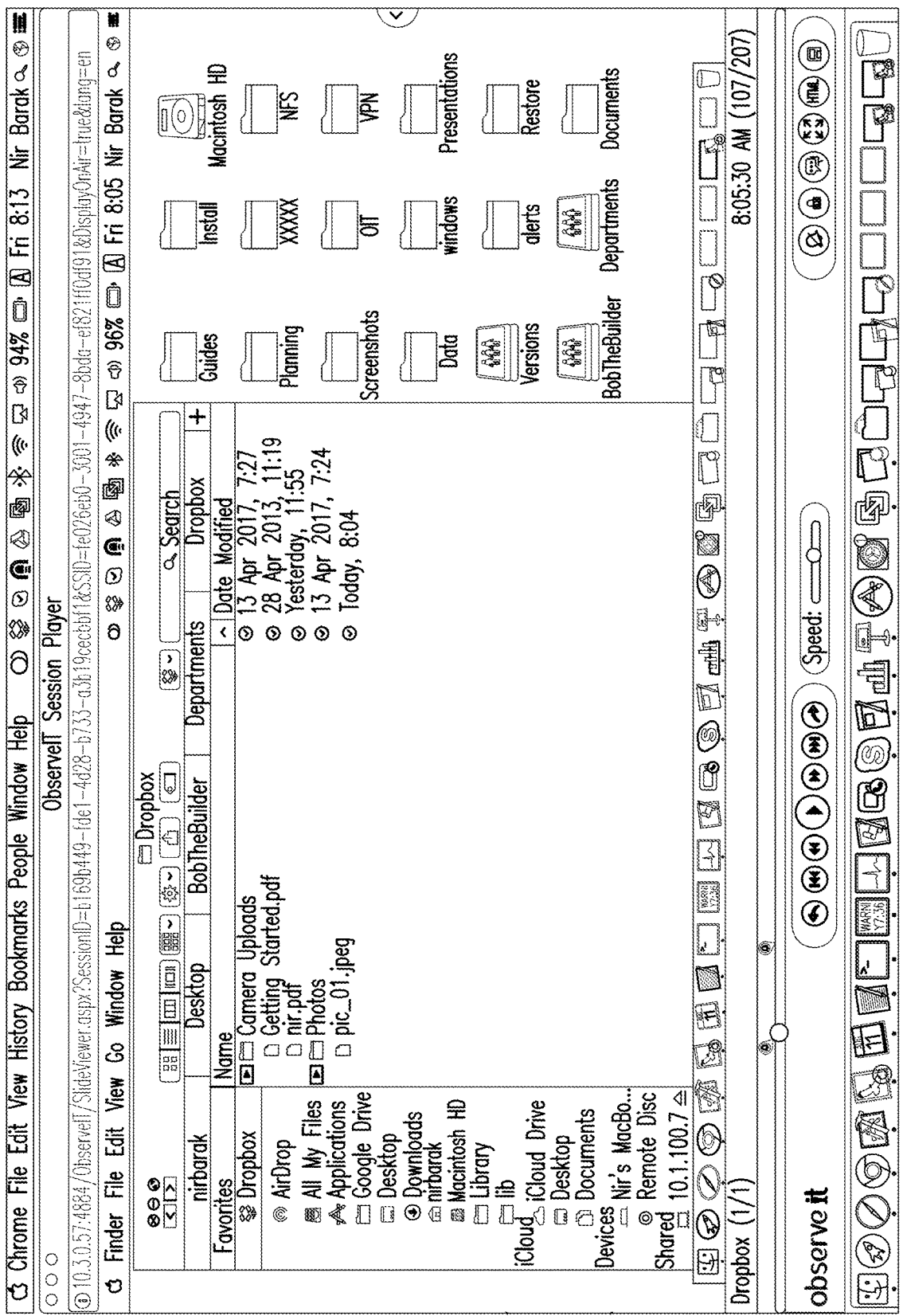

In FIG. 5C the video player shows the file appearing with the exfiltration point (in this example Dropbox).

Figure 5D:
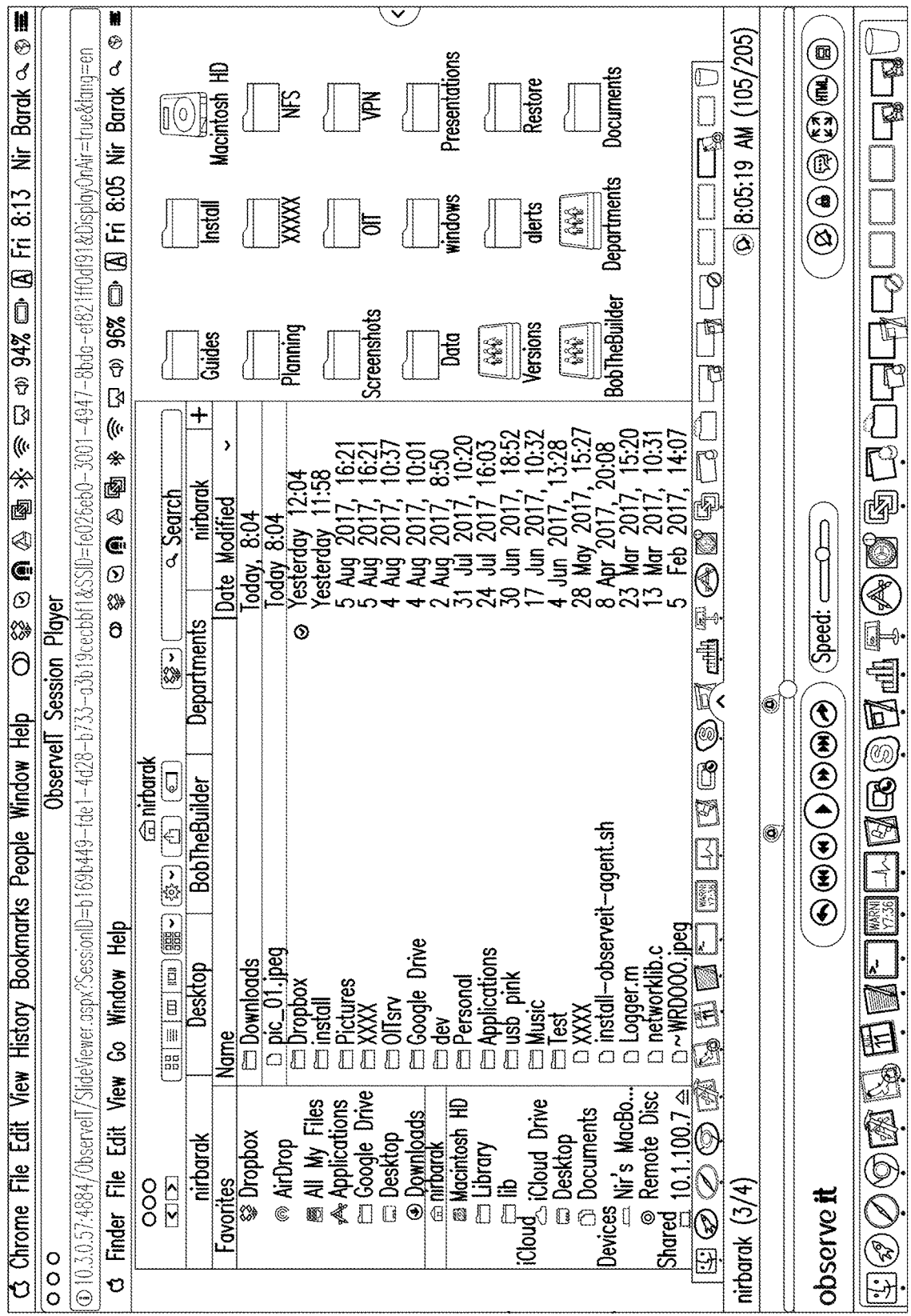

In FIG. 5D the video player shows the file being moved into Dropbox.

Figure 5E:
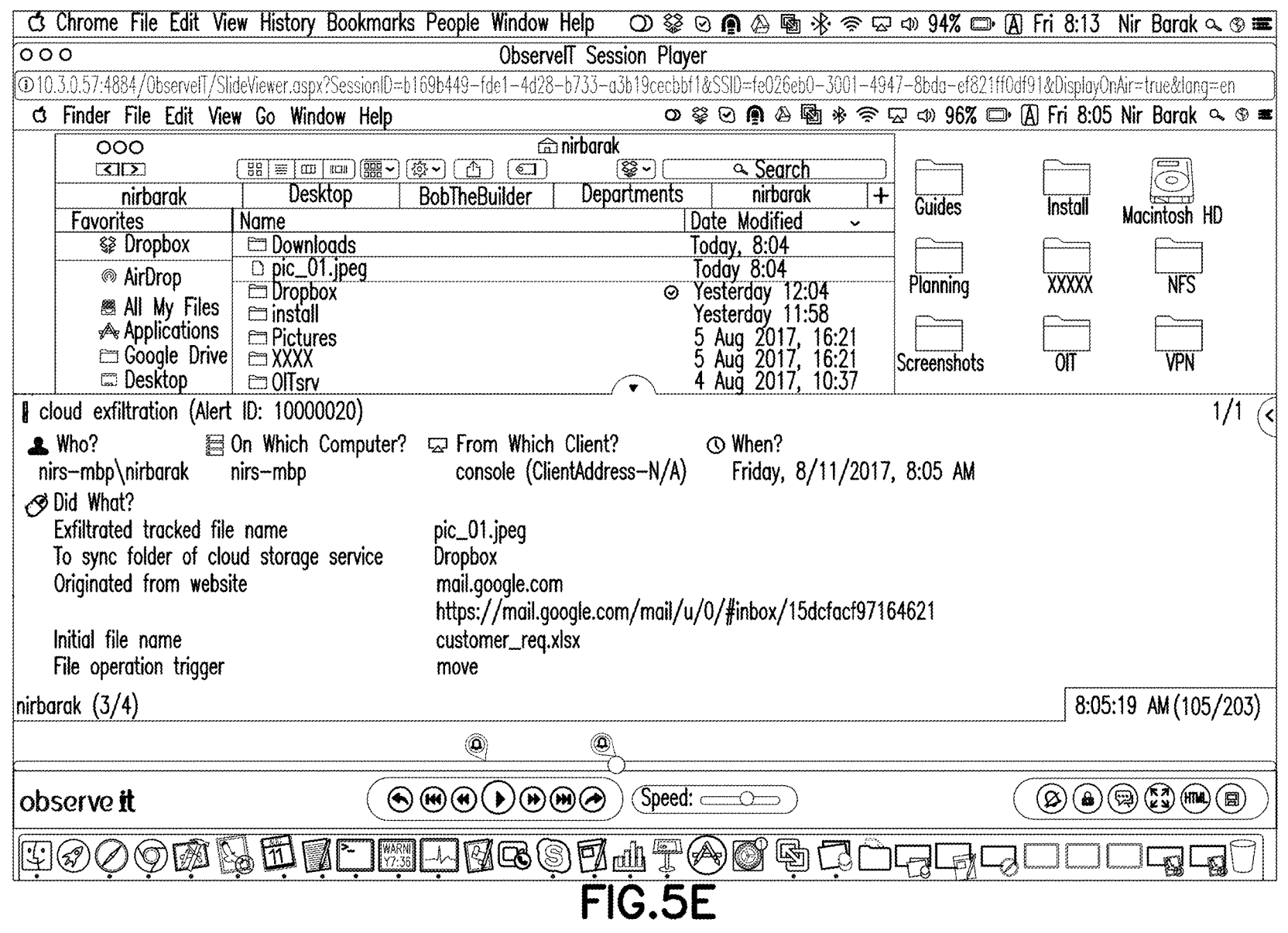

IN FIG. 5E the video player shows another alert. This alert indicates who performed the action that caused the alert, on which computer, from which client, and when. The alert also identifies what was done, including specifying the exfiltrated tracked file name, where the file was synched to, the originated from website, the initial file name, and the file operation trigger (e.g., move).

In a typical implementation, the information contained in a video clip such as the one represented in FIGS. 5A-5E provide system administrators, or the like, with a great deal of useful information about exfiltration events.

Figure 6:
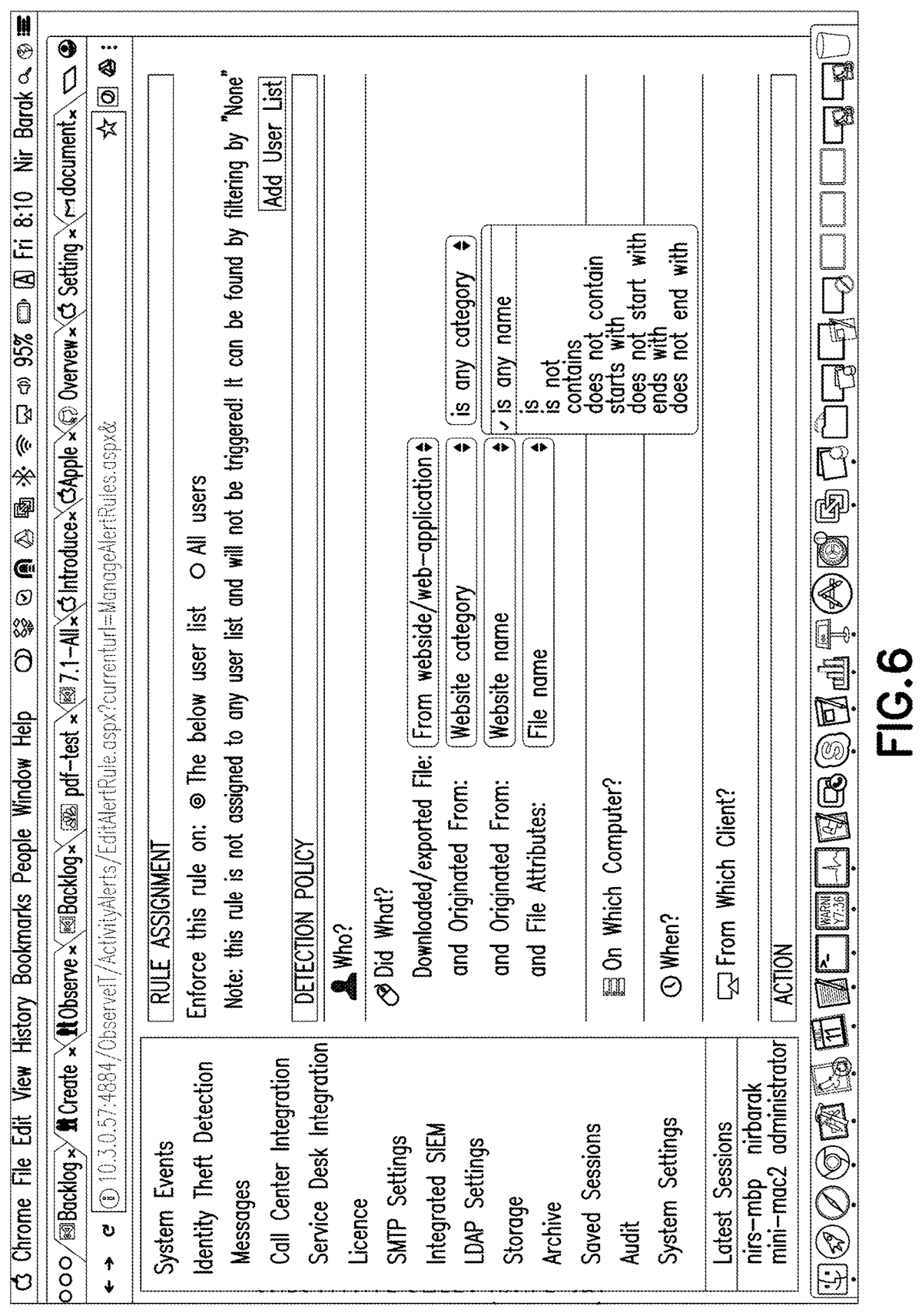
Figure 7:
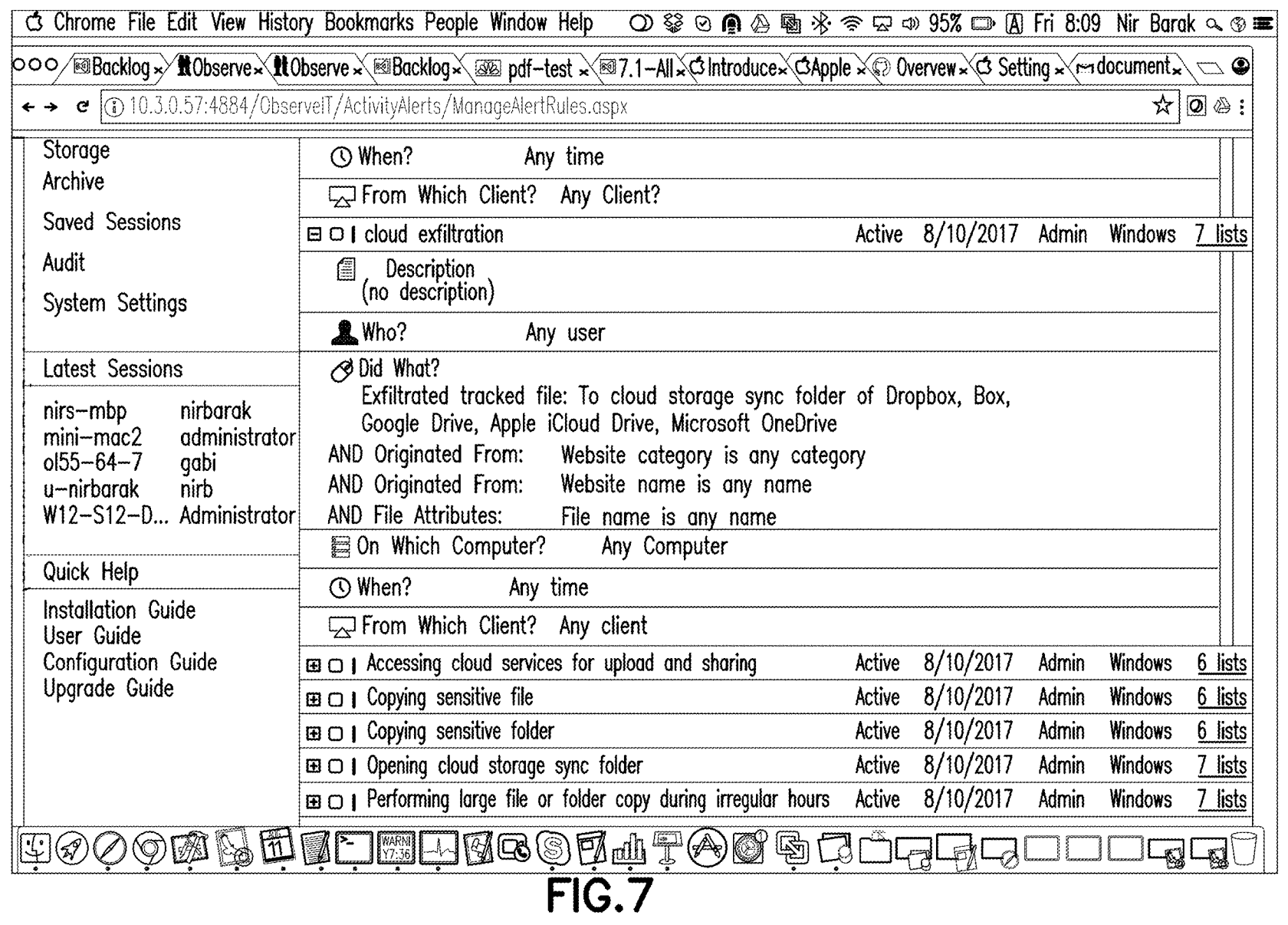

FIGS. 6 and 7 show a screenshot that includes functionality that enables a user to specify rules (e.g., detection policies) for the rules engine to apply in determining whether an exfiltration risk exists or not.

The upper portion of FIG. 6 shows is a portion of the screenshot that enables the user to specify who this rule should apply to (or be enforced on). The two choices provided are: all users or a list of specific user. The lower portion of FIG. 6 the screenshot includes functionality that allows the user to specify the contours of the particular rule (policy). In particular, the lower portion of the screenshot includes functionality that allows the user to set rules to produce an action based on who did what, on which computer, when, and from which client. The "did what" portion is further broken down, in the illustrated implementation, to enable specifying downloading or exporting files from particular locations, that were originated from particular categories of websites and/or named websites, and/or having particular file attributes. This screen also provides the user with functionality to specify the action to perform if the rules/policies so warrant an action.

The portion of the screenshot in FIG. 7 includes functionality that enables a user to define exfiltration points in the network. In a typical implementation, the user can define the exfiltration points based on the methods to take files out of the system (to be alerted on), for example~copy to dropbox, or to a Google drive, as well as entry points to track (e.g., from a specific website or category). In some implementations, the user may be able to limit tracking by file name or file type (the default may be to track all files from all sites).

Figure 8:
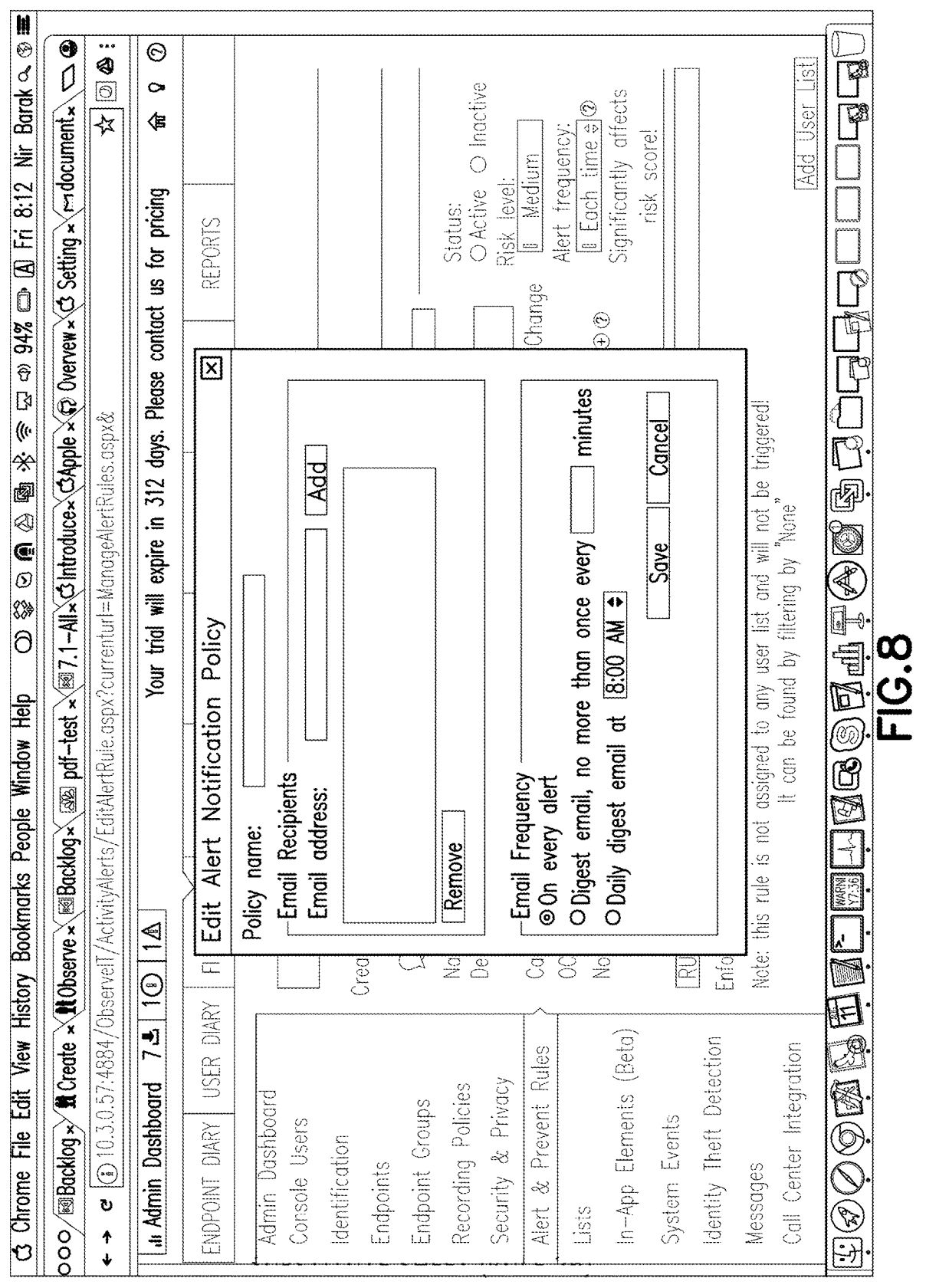

FIG. 8 has a pop-up that enables a user to edit an alert notification policy. The pop-up includes a field that the user can populate to identify the policy name that the user wants to edit. The pop-up includes another field that the user can populate with email addresses of users that should receive alerts (via email). The pop-up also includes buttons that enable the user to specify email frequency.

Figure 9:
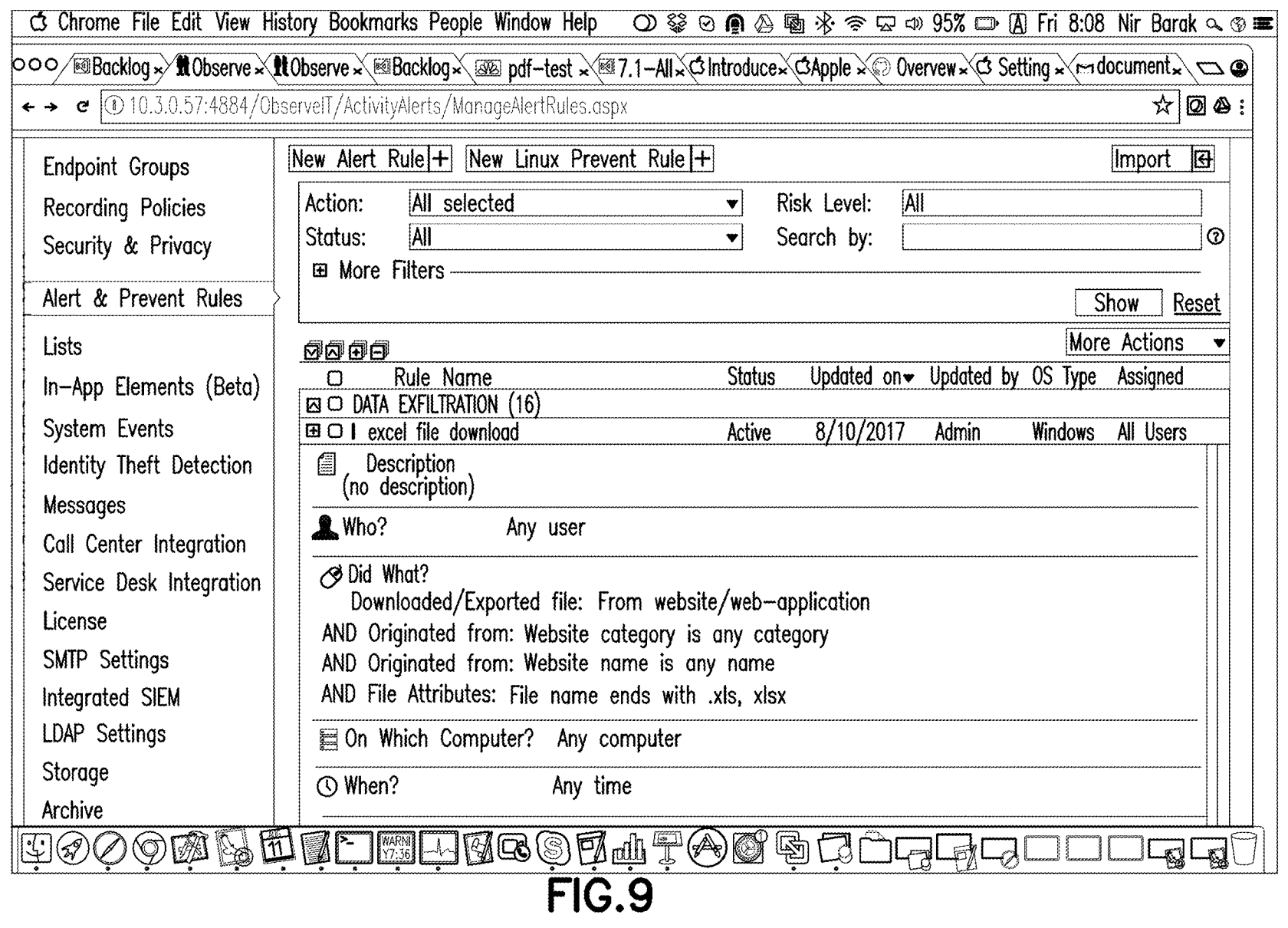

FIG. 9 is a screenshot that includes functionality that enables a user to specify when the system should alert and when the system should stop or block user activity. The screenshot in this regard enables the user to add new alert rules, or add new Linux prevent rules. The screenshot also includes a search functionality that enables the user to search for alert/prevent rules based on action, risk level, status, and/or, optionally, more filters. The bottom portion of the screenshot shows one rule name and its associated parameters.

A number of embodiments of the invention have been described. Nevertheless, it will be understood that various modifications may be made without departing from the spirit and scope of the invention.

For example, the techniques and technologies disclosed herein can be deployed in virtually any kind of computer network. The computer network can have a firewall and/or other security measures or not. The organization that runs, controls, or owns the network can be virtually any type of entity comprising multiple people, such as a business, an institution, or an association, that has one or more collective goals and is linked to an external environment. There are a variety of types of organizations, including, for example, corporations, governments, governmental entities, non-governmental organizations, political organizations, armed forces, charities, not-for-profit corporations, partnerships, cooperatives, educational institutions, religious organizations (e.g., churches), hybrid organizations (e.g., that operate in the public sector and private sector simultaneously), voluntary associations (including informal clubs), secret societies, etc.

In some implementations, the organization's computer network environment is defined by a computer-based firewall. The firewall can be virtually any kind of firewall. In computing, a firewall is a network security system that monitors and/or controls incoming and outgoing network traffic based on predetermined security rules. A firewall typically establishes a barrier between a trusted, secure internal network and another outside network, such as the Internet, that is assumed not to be secure or trusted. In some implementations, access to the organization's computer-based resources within the firewall may require a log in or satisfying some access criteria.

The network architecture, and/or the architecture of the exfiltration detection and response system can vary. For example, the functions and sub-components of the different exfiltration detection and response system can be combined, consolidated, or separated into a different configuration of sub-components. The sub-components can be local to one another (e.g., implemented in a single network component) or distributed across the network. Likewise, the functionalities associated with the exfiltration detection and response system and/or its sub-components can be performed by other components or sub-components.

The exfiltration detection and response system may be deployed in a variety of different ways within the computer network. For example, some portions of the exfiltration detection and response system may be incorporated into the specific computers (e.g., user access devices) on the computer network, whereas other portions of the exfiltration detection and response system may be incorporated on the server side of the computer network 102 (e.g., in one or more servers). More particularly, in one exemplary implementation, the rules for the rules engine and alert portions of the exfiltration detection system may be implemented on the server side of the computer network 102 (and serve, for example, the entire network), whereas the other portions of the exfiltration detection and response system (e.g., the history and exfiltration tracker, file interceptor and/or session monitoring agent) may be implemented in each respective one of the network computer devices. In those sorts of implementations, any portions of the exfiltration detection and response system incorporated into a particular network computer device typically would be dedicated to serving that particular network computer device.

The specific types of file management information and/or user activity information that the exfiltration detection and response system receives can vary. The filtering of any received information can vary. There are a variety of ways that this information might be collected. For example, in some implementations, the file management information may be collected based on the kernel action of the network's operating system. The user activity information may also come from the operating system, but typically is not based on the kernel action.

In this regard, for example, each session-monitoring agent may connect to a user session, and listen for specific user actions (e.g., which application is active, what it is doing, what website is being accessed, what browser is being used, meta data about the application (e.g., specific commands being run, FTP requests being made, etc.). The session-monitoring agents may be operable to always be running (and recording) inside a session (silently or not silently) and recording everything, or maybe set to operate based on a policy—e.g., set to operate on trigger. The session-monitoring agents may be configured to capture a video of the user's session (e.g., showing the user's screen during the entire session or during some relevant portion of the session), and/or collect data about the session in any one or more of a variety of ways.

For each session, the session monitoring agent typically gets a session ID from the operating system. If the user logs out and logs back in, the operating system and the exfiltration detection and response system treat that as a new session. Generally, session information does not include things like "open a file" or "move a file," but the system may learn about those things indirectly from session information (e.g., the session-level information may reveal that a user opened application known as WORD, and inside the header of document in WORD there is a name, so the system can assume that this is the name of the file that was being opened). In this sort of situation, the system may correlate the session level information with the file management information to be sure of the session level information's relevance.

The correlating functionalities can be performed in any one of several possible ways and can take into account various types of file management information (e.g., process IDs, user IDs, session IDs, file names, operations, time stamps, etc.), and session level information (e.g., session IDs, user IDs, process IDs, window IDs, information in the windows, time stamps, etc.).

The file history chains can be saved in one location or multiple locations and can be saved locally, remotely and/or in a distributed fashion. The rules engine can include and be configured to apply a wide variety of possible rules.

The exfiltration detection and response system can be implemented in a number of possible ways. Typically, the exfiltration detection and response system is implemented in software (e.g., saved in memory on the network, or in some non-transitory computer-based memory storage medium) that causes network processors, etc. to perform and/or facilitate the various functionalities disclosed herein as being attributable to the exfiltration detection and response system.

The design of the screenshots can vary considerably from the exemplary screenshots disclosed herein. There are various entry points that the system may use to start tracking a file (e.g., a sensitive origin, some suspicious activity, etc.), and there are various exit points that the system may consider as possible indicators that a file, or its contents might be exfiltrated from the network (e.g., Gmail, USB, cloud folder, etc.). Indeed, different entry point, exfiltration points or actions can be important to or be part of the system, like zipping or archiving a file or getting the file into the system in a different way like creating it using some application. The alerts and/or responses can take on any number of various forms. Different levels of user action blocking are possible. For example, a user's action may be blocked and accompanied by a message to the user (e.g., "you tried to do something that is not allowed" and giving reason why the action is not allowed).

The exfiltration detection and response system 118, and other components mentioned herein, interact with and receive information, directly or indirectly, from a network's operating system. The operating system can be virtually any kind of operating system including, for example, a mobile device operating system, or any other kind of operating system. In general, an operating system is a program that, after being initially loaded into a computer or network, manages other programs in the computers of the network.

In some implementations, certain functionalities described herein may be provided by a downloadable software application (i.e., an app). The app may, for example, implement or facilitate one or more (or all) of the functionalities described herein as taking place at or in association with a website.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

At least some of the functionalities associated with the system disclosed herein can be accessed from virtually any kind of electronic computer device, including, for example, cell phones and tablet.

Other implementations are within the scope of the claims.

What is claimed is:

1. A computer-based method to facilitate managing data exfiltration risk in a computer network environment, the computer-based method comprising:
    collecting computer file management information associated with each respective one of a plurality of computer files in an organization's computer network environment from a computer operating system;
    collecting user activity information associated with each respective one of a plurality of user sessions by users having access to the organization's computer network environment with a plurality of session monitoring agents, wherein one of the session-monitoring agents is deployed for each respective one of the plurality of user sessions;
    correlating at least some of the collected user activity information to a particular one of the computer files associated with the collected file management information to produce a single file history chain for the particular one of the computer files, wherein the single file history chain contains the correlated user activity information and the collected file management information associated with the particular one of the computer files; and
    assessing data exfiltration risk with respect to a particular one of the computer files based at least in part on the collected file management information and the correlated user activity information in the single file history chain.

2. The computer-based method of claim 1, further comprising:
    presenting an alert to one or more particular system users, if the assessment reveals that the data exfiltration risk exists with respect to any one or more of the computer files.

3. The computer-based method of claim 1, further comprising:
    preventing a user action that would result in a data exfiltration associated with one of the computer files, if the assessment reveals that the data exfiltration risk exists with respect to that computer file.

4. The computer-based method of claim 1, wherein the exfiltration risk is assessed without regard to content in any of the one or more computer files.

5. The computer-based method of claim 1, further comprising:
    identifying which of the computer files in the organization's computer network environment should be tracked for purposes of assessing the data exfiltration risk with respect to those computer files.

6. The computer-based method of claim 5, further comprising:
    creating a corresponding one of the file history chains for each respective one of the computer files identified for tracking.

7. The computer-based method of claim 5, wherein identifying which of the computer files should be tracked for possible data exfiltration takes into account each computer file's original storage location in the organization's computer network environment, and/or whether any suspicious actions may have been performed by a user on that computer file.

8. The computer-based method of claim 5, wherein assessing the exfiltration risk comprises:
    utilizing a rules engine to check whether one or more particular actions in a tracked file history chain or characteristics associated with a particular one of the computer files being tracked creates the data exfiltration risk.

9. The computer-based method of claim 1, wherein correlating at least some of the collected user activity information to one or more of the computer files associated with the collected file management information comprises:
    comparing time stamp information, session identifiers, user identifiers, and/or process identifiers associated with the collected computer file management information to time stamp information, session identifiers, user identifiers, and/or process identifiers associated with the collected user activity information.

10. The computer-based method of claim 1, wherein the computer file management information comprises information about one or more of the following: creating a file, opening a file, renaming a file, moving a file, copying a file, deleting a file, searching for a file, encrypting a file, putting a file into an archive, and/or modifying one or more file attributes, properties, or file permissions.

11. The computer-based method of claim 1, wherein each respective one the user sessions corresponds to a period of time between a particular system user logging into and subsequently logging out of the computer environment.

12. The computer-based method of claim 1, wherein the organization's computer network environment has a firewall that that restricts communications between the computer network environment and other computer resources and devices outside of the computer network environment.

13. The computer-based method of claim 1, further comprising:
filtering the computer file management information to remove out any information related to or including temporary files prior to the correlating.

14. A computer system comprising:
a plurality of computer-based user access devices and resources within a computer network that has a firewall;
an operating system to support computer operations within the computer network;
an exfiltration detection and response system configured to interact with the operating system, and to facilitate managing data exfiltration risk in the computer network, wherein the data exfiltration system comprises:
a file interceptor to receive computer file management information associated with each respective one of a plurality of computer files in the computer network from the operating system;
one or more session-monitoring agents to collect user activity information associated with each respective one or more user sessions on the computer network by users having access to the computer network;
a history and exfiltration tracker to correlate at least some of the collected user activity information to a particular one of the computer files associated with the file management information received from the operating system to produce a single file history chain for the particular one of the computer files, wherein the single file history chain contains the correlated user activity information and the collected file management information associated with the particular one of the computer files; and
a rules engine to assess exfiltration risk with respect to a particular one or more of the computer files based at least in part on the file management information and the correlated user activity information in the single file history chain.

15. The computer system of claim 14, wherein the exfiltration detection and response system is configured to present an alert to one or more particular users of the system logged into the computer network from any one of the computer-based user access devices, in response to the rules engine determining that an exfiltration risk exists with respect to a particular one of the one or more computer files.

16. The computer system of claim 14, wherein the exfiltration detection and response system is configured to prevent a user action that would result in a data exfiltration, in response to the rules engine determining that an exfiltration risk exists with respect to a particular one of the one or more computer files.

17. The computer system of claim 14, wherein the exfiltration detection and response system assesses the data exfiltration risk without regard to substantive content in any of the one or more computer files.

18. The computer system of claim 14, wherein the history and exfiltration tracker identifies which, if any, of the computer files should be tracked for purposes of the data exfiltration risk assessment, based on each computer file's original storage location in the organization's computer network environment, and/or whether any suspicious actions have performed by a user on each computer file.

19. The computer system of claim 14, wherein the rules engine assesses the exfiltration risk for a particular one of the computer files being tracked by checking whether one or more particular actions or characteristics associated with that computer file creates the exfiltration risk.

20. The computer system of claim 14, wherein the history and exfiltration tracker correlates at least some of the collected user activity information to the one or more of the computer files associated with the collected file management information by:
comparing time stamp information, session identifiers, user identifiers, and/or process identifiers associated with the received computer file management information to time stamp information, session identifiers, user identifiers, and/or process identifiers associated with the collected user activity information.

21. The computer system of claim 14, wherein the computer file management information comprises information about one or more of the following: creating a file, opening a file, renaming a file, moving a file, copying a file, deleting a file, searching for a file, encrypting a file, putting a file into an archive, and/or modifying one or more file attributes, properties, or file permissions, and
wherein each respective one the user sessions corresponds to a period of time between a particular system user logging into and logging out of the computer environment.

22. The computer system of claim 14, wherein the one or more session-monitoring agents comprise one session-monitoring agent for each respective one of the user sessions in the computer environment.

23. The computer system of claim 14, wherein the file interceptor is configured to filter the file management information to remove any information related to or including temporary files before the history and exfiltration tracker correlates the file management information.

24. A computer system comprising:
a plurality of computer-based user access devices and resources within a computer network that has a firewall;
an operating system to support computer operations within the computer network;
an exfiltration detection and response system configured to interact with the operating system, and to facilitate managing data exfiltration risk in the computer network, wherein the data exfiltration system comprises:
a file interceptor to receive computer file management information associated with each respective one of a plurality of computer files in the computer network from the operating system;
one or more session-monitoring agents to collect user activity information associated with each respective one or more user sessions on the computer network by users having access to the computer network;
a history and exfiltration tracker to correlate at least some of the collected user activity information to a particular one of the computer files associated with the file management information received from the operating system to produce a single file history chain for the particular one of the computer files, wherein the single file history chain contains the correlated user activity information and the collected file management information associated with the particular one of the computer files,
wherein the history and exfiltration tracker identifies which, if any, of the computer files should be tracked for purposes of the data exfiltration risk assessment, based on each computer file's original storage location in the organization's computer network environment, and/or whether any suspicious actions have performed by a user on each computer file, wherein the history and exfiltration tracker correlates at least some of the collected user activity information to the one or more of the computer files associated with the collected file management information by:

comparing time stamp information, session identifiers, user identifiers, and process identifiers associated with the received computer file management information to time stamp information, session identifiers, user identifiers, and process identifiers associated with the collected user activity information; and a rules engine to assess exfiltration risk with respect to a particular one of the computer files based at least in part on the file management information and the correlated user activity information in the single file history, and wherein the exfiltration detection and response system assesses the data exfiltration risk without regard to substantive content in any of the one or more computer files.

* * * * *